(12) United States Patent
Atkins et al.

(10) Patent No.: US 9,613,407 B2
(45) Date of Patent: Apr. 4, 2017

(54) DISPLAY MANAGEMENT FOR HIGH DYNAMIC RANGE VIDEO

(71) Applicant: Dolby Laboratories Licensing Corporation, San Francisco, CA (US)

(72) Inventors: Robin Atkins, Campbell, CA (US); Samir N. Hulyalkar, Los Gatos, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 24 days.

(21) Appl. No.: 14/755,755

(22) Filed: Jun. 30, 2015

(65) Prior Publication Data

US 2016/0005153 A1    Jan. 7, 2016

Related U.S. Application Data

(60) Provisional application No. 62/020,622, filed on Jul. 3, 2014, provisional application No. 62/092,960, filed on Dec. 17, 2014.

(51) Int. Cl.
*G09G 5/10* (2006.01)
*G09G 5/02* (2006.01)
(Continued)

(52) U.S. Cl.
CPC .............. *G06T 5/007* (2013.01); *G06K 9/52* (2013.01); *G09G 5/10* (2013.01); *H04N 1/60* (2013.01);
(Continued)

(58) Field of Classification Search
CPC combination set(s) only.
See application file for complete search history.

(56) References Cited

U.S. PATENT DOCUMENTS 5,737,032 A    4/1998  Stenzel
7,822,270 B2 * 10/2010  Van Hoof ............ H04N 1/6058
                                                            382/167
(Continued)

FOREIGN PATENT DOCUMENTS

EP        1073284       1/2001
EP        1385143       1/2004
WO      2013/046096     4/2013

OTHER PUBLICATIONS

Zolliker, P. et al "Retaining Local Image Information in Gamut Mapping Algorithms" IEEE Transactions on Image Processing, Piscataway, NJ, US, vol. 16, No. 3, Mar. 1, 2007, p. 665.
(Continued)

*Primary Examiner* — Wesner Sajous

(57) ABSTRACT

A display management processor receives an input image with enhanced dynamic range to be displayed on a target display which has a different dynamic range than a reference display. The input image is first transformed into a perceptually-quantized (PQ) color space. A non-linear mapping function generates a tone-mapped intensity image in response to the characteristics of the source and target display and a measure of the intensity of the PQ image. After a detail-preservation step which may generate a filtered tone-mapped intensity image, an image-adaptive intensity and saturation adjustment step generates an intensity adjustment factor and a saturation adjustment factor as functions of the measure of intensity and saturation of the PQ image, which together with the filtered tone-mapped intensity image are used to generate the output image. Examples of the functions to compute the intensity and saturation adjustment factors are provided.

25 Claims, 4 Drawing Sheets

(51) Int. Cl.
*G06T 5/00* (2006.01)
*H04N 1/60* (2006.01)
*H04N 9/67* (2006.01)
*G06K 9/52* (2006.01)
*H04N 9/68* (2006.01)

(52) U.S. Cl.
CPC ................ *H04N 9/67* (2013.01); *H04N 9/68* (2013.01); *G06T 2207/20208* (2013.01); *G09G 5/02* (2013.01); *G09G 2320/0271* (2013.01); *G09G 2340/06* (2013.01); *G09G 2370/04* (2013.01)

(56) References Cited

U.S. PATENT DOCUMENTS

| | | | |
|---|---|---|---|
| 9,076,224 B1* | 7/2015 | Shah | G06T 5/009 |
| 9,077,994 B2 | 7/2015 | Miller | |
| 9,224,363 B2* | 12/2015 | Ballestad | H04N 1/6027 |
| 2013/0120656 A1 | 5/2013 | Wilson | |
| 2014/0002478 A1 | 1/2014 | Ballestad | |
| 2014/0037205 A1* | 2/2014 | Su | G06T 5/009 |
| | | | 382/166 |
| 2015/0256860 A1* | 9/2015 | Kunkel | G06T 5/00 |
| | | | 348/598 |
| 2016/0005349 A1* | 1/2016 | Atkins | H04N 5/20 |
| | | | 345/591 |
| 2016/0080716 A1* | 3/2016 | Atkins | H04N 5/44504 |
| | | | 348/599 |
| 2016/0248939 A1* | 8/2016 | Thurston, III | G06T 5/50 |

OTHER PUBLICATIONS

Mantiuk, R. et al "Color Correction for Tone Mapping" Computer Graphics Forum, Wiley-Blackwell Publishing Ltd. vol. 28, No. 2, Apr. 1, 2009, pp. 193-202.

Liu, Z. et al "The Research on Mechanism of Color Management System Based on iCam Color Appearance Model" Computers and Mathematics with Applications, Pergamon Press, vol. 57, No. 11-12, Jun. 1, 2009, pp. 1829-1834.

Fairchild, M. D. et al "Predicting the Lightness of Chromatic Object Colors Using CIELAB" Color Research & Application, vol. 16, No. 6, Dec. 1, 1991, p. 386.

ITU-R BT.1866, Mar. 2010.

Ebner, F. et al "Development and Testing of a Color Space (IPT) with Improved Hue Uniformity" Proc. 6th Color Imaging Conference: Color Science, Systems, and Applications, IS&T, Scottsdale, Arizona, Nov. 1998, pp. 8-13.

* cited by examiner

DISPLAY MANAGEMENT FOR HIGH DYNAMIC RANGE VIDEO

CROSS-REFERENCE TO RELATED APPLICATIONS

This application claims the benefit of priority to U.S. Provisional Patent Application Ser. No. 62/020,622, filed on Jul. 3, 2014, and U.S. Provisional Patent Application Ser. No. 62/092,960, filed on Dec. 17, 2014, each of which is hereby incorporated by reference in its entirety for all purposes. This application is also related to PCT Application with Ser. No. PCT/US2014/016304, filed on Feb. 13, 2014, which is incorporated herein by reference in its entirety.

TECHNOLOGY

The present invention relates generally to images. More particularly, an embodiment of the present invention relates to the display management process of images with high or enhanced dynamic range.

BACKGROUND

As used herein, the term 'dynamic range' (DR) may relate to a capability of the human visual system (HVS) to perceive a range of intensity (e.g., luminance, luma) in an image, e.g., from darkest darks (blacks) to brightest brights (whites). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is simultaneously perceivable by a human visual system (HVS). As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

Most consumer desktop displays support luminance of 200 to 300 cd/m² or nits. Most consumer HDTVs range from 300 to 1000 cd/m². Such conventional displays thus typify a low dynamic range (LDR), also referred to as a standard dynamic range (SDR), in relation to HDR or EDR. As the availability of EDR content grows due to advances in both capture equipment (e.g., cameras) and EDR displays (e.g., the PRM-4200 professional reference monitor from Dolby Laboratories), EDR content may be color graded and displayed on EDR displays that support higher dynamic ranges (e.g., from 1,000 nits to 5,000 nits or more). In general, the methods of the present disclosure relate to any dynamic range higher than SDR. As appreciated by the inventors here, improved techniques for the display management of high-dynamic range images onto HDR and SDR displays are desirable for both backward compatibility and a superior immersive experience.

As used herein, the term "display management" denotes the processing (e.g., tone and gamut mapping) required to map an input video signal of a first dynamic range (e.g., 1000 nits) to a display of a second dynamic range (e.g., 500 nits).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Efficient display management (e.g., tone and gamut mapping) of enhanced dynamic range (EDR) images is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to the efficient display management of EDR images. A display management processor receives an input image with enhanced dynamic range to be displayed on a target display which has a different dynamic range than a source reference display. The input image is first transformed from an input color space (e.g., RGB or YCbCr) into a perceptually-quantized (PQ) color space (e.g., LMS-PQ), and a metric of the intensity of the PQ color image is generated. A non-linear tone-mapping function generates a tone-mapped intensity image in response to the characteristics of the source and target displays and the intensity of the PQ image. After an optional detail-preservation step which may adjust the tone-mapped image to generate a filtered tone-mapped intensity image, an image-adaptive intensity and saturation adjustment step generates an intensity adjustment factor and a saturation adjustment factor as functions of the intensity and saturation of the PQ image, which together with the filtered tone-mapped intensity image are used to generate an output PQ image. In some embodiments the output PQ image may be transformed back to another linear or gamma-corrected color space (e.g., RGB or YCbCr) before further processing or display.

In an embodiment, the function to generate the intensity adjustment factor has a quadratic input-output characteristic and the function to generate the saturation adjustment factor has an input-output characteristic that depends on the slope of the tone-mapping function.

In an embodiment the functions related to generate the tone-mapped data and the intensity and saturation adjustments may be pre-computed using look-up tables.

Example Display Management Processing Pipeline

Figures 1, 2:
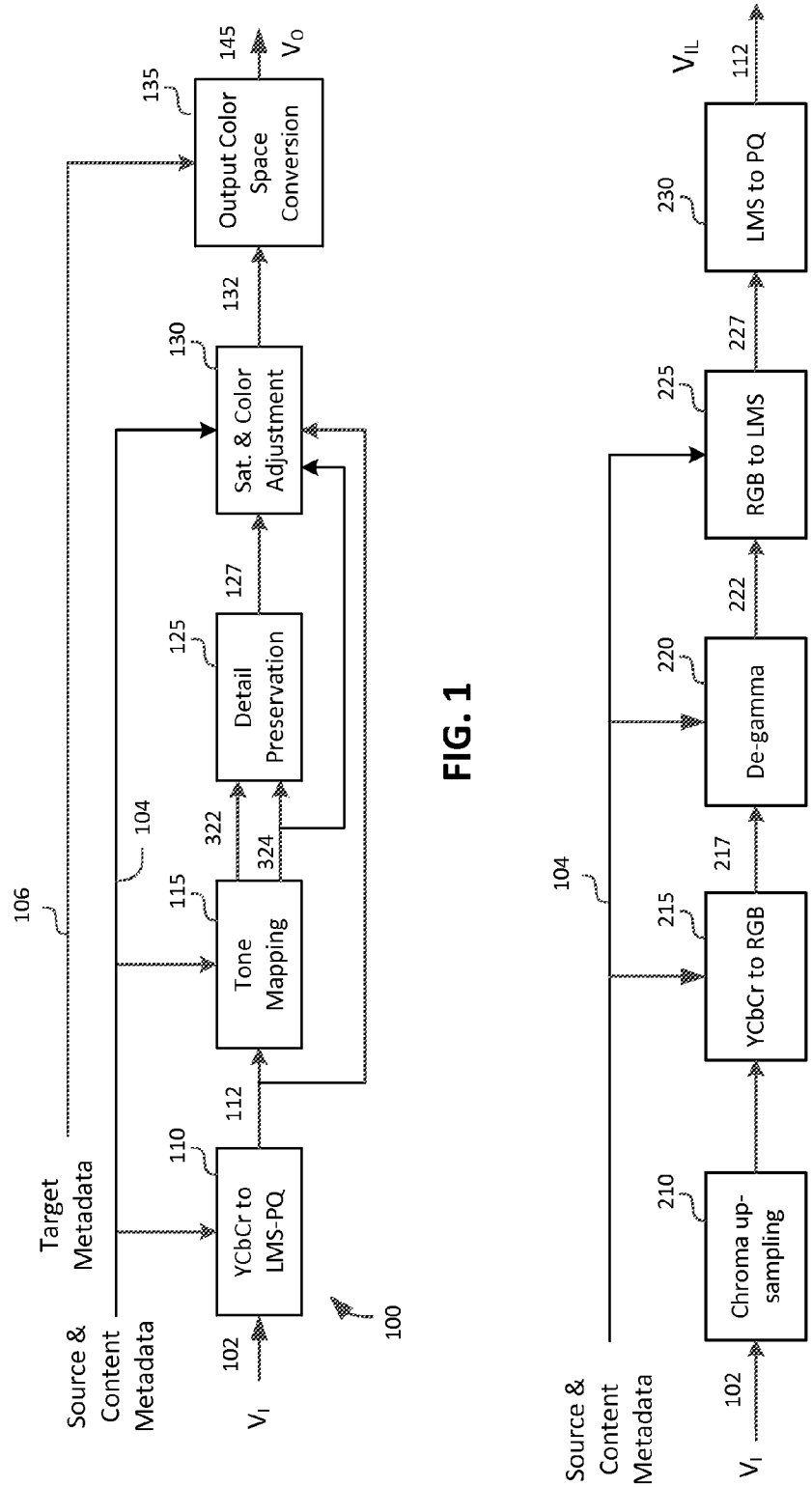
FIG. 1 depicts an example process for the display management of EDR images according to an embodiment of the present invention.
FIG. 2 depicts an example process for converting input EDR data from an input color space into the LMS-PQ space according to an embodiment of the present invention.

FIG. 1 depicts an example process for the display management of EDR images (which also may be referred to as HDR images) according to an embodiment of the present invention. This process shares many similarities with the display management process described in PCT Application with Ser. No. PCT/US2014/016304, to be referred from now on as the '304 Application, filed on Feb. 13, 2014, which is incorporated herein by reference in its entirety; however, the proposed embodiments include multiple improvements that allow for reduced computational complexity while improving overall image quality.

As depicted in FIG. 1, a video processor (e.g., a set-top box, an image display, or other suitable image processor) receives EDR input $V_I$ (102) and optionally associated metadata (104) and (106). EDR input (102) may comprise part of a frame or a full frame of a sequence of images, such as an EDR video signal. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

The received EDR input (102) may be in an RGB color format or any other color space, such as YCbCr, XYZ, and the like. The received image may have been color graded on a reference EDR monitor which may have different dynamic range and color gamut characteristics than a target display monitor. As used herein, the term "color grading" denotes the process of adjusting the color of an image or video to correct color artifacts and/or to match the director's intent.

EDR input (102) may also include source display metadata (104) related to the display used to color grade the image during program production. For example, such metadata may include the reference electro-optical transfer function (EOTF) as defined by Recommendation ITU-R BT.1866 (March 2011). The EDR input may also include additional source display and content metadata (106), such as the maximum and minimum brightness of the source or reference display, the maximum, minimum, and average mid-tone of the data, and the intensity of ambient light during color grading. For example, the metadata for a reference monitor may include the following example parameters used in production:

Source Monitor Min. brightness, Smin=0.005 nits;
Source Monitor Max. brightness, Smax=4000 nits;
Ambient Light, Samb=10 nits;
Gamma, Sgamma=2.4;
Color Space=DCI P3, White Point=D65;

Metadata for the reference monitor need to be transmitted typically only once; however, metadata for the video data may be transmitted on a per-frame basis, on a per-scene basis, or whenever there is a change. If there are no metadata related to the source content, then in some embodiments such data may be extracted by analyzing the source video content.

The LMS-PQ Color Space

In a preferred embodiment, the processing pipeline (100) is performed in what will be referred to as the LMS-PQ color space; however, similar processing steps may be performed in other color spaces, such as RGB, YCbCr, XYZ, CIE-Lab, and the like.

The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. Examples of PQ mapping functions are described in PCT Application with Ser. Number PCT/US2012/068212 (to be referred as the '212 application) titled "Perceptual luminance nonlinearity-based image data exchange across different display capabilities," by J. S. Miller et al., filed on Dec. 6, 2012, and incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve, as determined by the '212 application, imitates the true visual response of the human visual system using a relatively simple functional model. Compared to the '304 Application, processing in LMS-PQ space allows for a simpler implementation than processing in the IPT-PQ space, while it still preserves the benefits of operating in a perceptually quantized color space, such as requiring a smaller bit depth for the processing pipeline.

Table 1 describes the calculation of the Perceptual Curve EOTF for converting digital video code values into absolute linear luminance levels at a point of display. Also included is the inverse EOTF calculation for converting absolute linear luminance into digital code values

TABLE 1

Exemplary Equation Definitions:

D = Perceptual Curve digital code value, SDI-legal unsigned integer, 10 or 12 bits
b = number of bits per component in digital signal representation, 10 or 12
V = normalized Perceptual Curve signal value, $0 \leq V \leq 1$
Y = normalized luminance value, $0 \leq Y \leq 1$
L = absolute luminance value, $0 \leq L \leq 10{,}000$ cd/m²

Exemplary EOTF Decode Equations:

$$V = \frac{D - 4 \cdot 2^{b-10}}{1015 \cdot 2^{b-10}}$$

$$Y = \left( \frac{\max\left[\left(V^{\frac{1}{m}} - c_1\right), 0\right]}{c_2 - c_3 V^{\frac{1}{m}}} \right)^{\frac{1}{n}} \quad (t1)$$

$$L = 10{,}000 \cdot Y$$

Exemplary Inverse EOTF Encode Equations:

$$Y = \frac{L}{10{,}000}$$

$$V = \left( \frac{c_1 + c_2 Y^n}{1 + c_3 Y^n} \right)^m \quad (t2)$$

$$D = \text{INT}\,(1015 \cdot V \cdot 2^{b-10}) + 4 \cdot 2^{b-10} \quad (t3)$$

Exemplary Constants:

$$n = \frac{2610}{4096} \times \frac{1}{4} \approx 0.15930176$$

$$m = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Notes:
1. The operator INT returns the value of 0 for fractional parts in the range of 0 to 0.4999 ..., and +1 for fractional parts in the range of 0.5 to 0.9999 ..., i.e. it rounds up fractions above 0.5.
2. All constants are defined as exact multiples of 12 bit rationals to avoid rounding concerns.
3. R, G, or B signal components are to be computed in the same way as the Y signal component described above.

FIG. 2 depicts an in more detail an example process for the color conversion step (110), according to an embodiment. As depicted in FIG. 2, given input EDR signal $V_I$ (102) which is in a first color format (e.g., YCbCr 4:2:0), color space transformation step (110) translates it into signal $V_{IL}$ (112) in the perceptually-corrected LMS color space (LMS-PQ). This color transformation may comprise the following steps:

a) Steps (210) and (215), if needed, may perform chroma up-sampling and other color transformations (e.g., YCbCr to RGB) to convert the input (102) into the RGB color space (217). In an embodiment, color transformation (215) may be performed using a 3×3 matrix and an offset included in the source metadata (104).

b) Input EDR signal (102) may be gamma coded or PQ coded, which is typically signaled using source metadata (104). Step (220) may use the EOTF (as provided by metadata (104)) to reverse or undo the source display's conversion from code values to luminance. For example, if the input signal is gamma coded, then this step applies an inverse gamma function. If the input signal is PQ-encoded according to the "212 PCT Application, then this step applies an inverse PQ function. In practice, the "de-gamma" step (220) may be performed using three pre-computed 1-D Look-up tables (LUTs).

c) Step (225) converts the output signal of step b) (222) to a signal (227) in the LMS color space. Typically, this step is performed by applying a 3×3 matrix controlled by the metadata (104).

d) Finally, step (230) applies the PQ encoding to each of the L, M, and S color components to generate output $V_{IL}$ (112) in the LMS-PQ color space. This step can also be performed using three 1-D LUTs.

In some embodiments, the complete color transformation pipeline (e.g., 110) may be computed using a 3D LUT.

Tone Mapping

Figure 3:
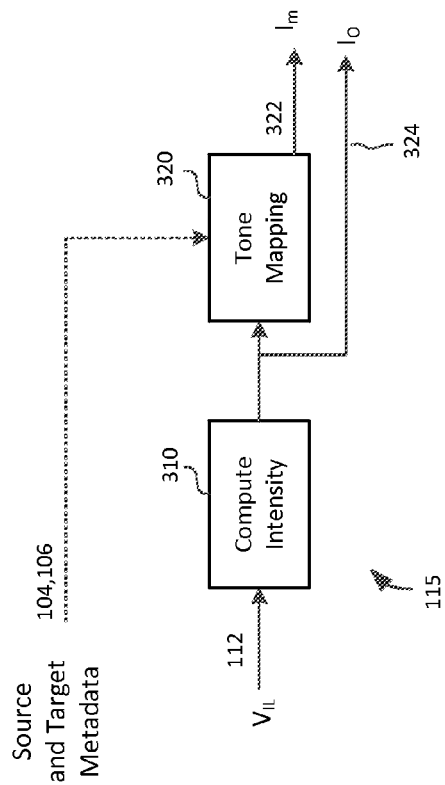
FIG. 3 depicts an example process for non-linear dynamic range mapping for EDR images according to an embodiment of the present invention.

After the color transformation step (110), the intensity ($I_O$) of signal $V_{IL}$ (112) needs to be mapped to fit within the constraints of the target display. As depicted in FIG. 3, given the LMS-PQ signal $V_{IL}$ (112), step (310) computes intensity signal $I_O$ (324). In an example embodiment, given the $V_{IL}$ input (112) in LMS-PQ space, a measure of intensity can be computed as the maximum of each of the color components; e.g.:

$$I_O = \max(L, M, S),$$

where L, M, and S denote the pixel values for each color component of input (112). In an another embodiment, the value of $I_O$ may be computed using a weighted average of the LMS values, such as $$I_O = w_1 L + w_2 M + w_3 S,$$

where $w_i$, for i=1,2,3, denotes a weight in the range [0 1], and typically the sum of all weights sums to one (e.g., $w_1=0.4$, $w_2=0.4$, and $w_3=0.2$). In another embodiment, the value of $I_O$ may be computed as a weighted average of the maximum of the three color component values and a weighted average, e.g., $$I_O = W_I * (w_1 L + w_2 M + w_3 S) + (1 - W_I) * \max(L, M, S), \quad (1)$$

where $W_I$ is a scene-dependent weight in the range [0 1] and is typically controlled by the metadata (e.g., $W_I=0.5$ for most scenes, and $W_I=0$ or $W_I=1$ for certain scenes). In one embodiment, all weights $w_i$, for i=1,2,3, are equal (e.g., $w_i=\frac{1}{3}$ for i=1,2,3). In another embodiment, $w_1=0.4$, $w_2=0.4$, and $w_3=0.2$.

Tone mapping function (320) applies a non-linear mapping to the input data $V_{IL}$ (112) to generate tone-mapped intensity data $I_m$ (322) (e.g., $I_m = f_T(I_O)$).

An example non-linear mapping transform is described by A. Ballestad et al., in U.S. Pat. No. 8,593,480, (to be referred as the '480 Patent), titled "Method and apparatus for image data transformation," which is incorporated herein by reference in its entirety.

According to the '480 Patent, an example transfer function for non-linear mapping may be denoted as $$Y_{out} = \left( \frac{C_1 + C_2 Y_{in}^n}{1 + C_3 Y_{in}^n} \right)^m, \quad (2)$$

where $C_1$, $C_2$, and $C_3$ are constants, $Y_{in}$ is the input value for a color channel (e.g., $I_O$), $Y_{out}$ is the output value for the color channel, and n and m are parameters. This transfer function is an example of a parameterized sigmoidal tone curve function. Parameters $C_1$, $C_2$, and $C_3$ are determined based on the definition of three anchor points, which in turn are defined based on the brightness characteristics of the reference (or source) display, which are typically extracted from input metadata (106), and the brightness characteristics of the target display, which are typically already known to the processor performing the display management process.

In an example embodiment, step (320) may compute the tone curve parameters of equation (2) as follows:
Let Tmin, and Tmax denote the minimum and maximum brightness of the target display, represented with PQ encoding. Let also Smin, and Smax denote the minimum and maximum brightness of the source display, also PQ encoded, then, in an embodiment, the S2Tratio may be defined as:

$$S2Tratio = \sqrt{\frac{Tmax + Tmin}{Smax + Smin}}. \qquad (3)$$

Without loss of generality, in some embodiments, the value of S2Tratio may also be bounded to never be more than one; that is, the decoder may assume that the reference display is always at least as bright as the target display. Note that if the S2Tratio=1, parts of step (115) may be skipped.

In some embodiments, the mapping process may also take into consideration the size difference between the source and target displays. For example, $$ScreenRatio = \sqrt{\frac{\log_2(Tdiag)}{\log_2(Sdiag)}},$$

provides a measure based on the diagonal sizes (e.g., measured in inches) of the target display (Tdiag) and the source display (Sdiag). In some embodiments, the value of ScreenRatio may be set to 1 regardless of the size of the source and target displays.

Without loss of generality, let the input sequence be characterized by three variables, which in an example embodiment are denoted by the variables Crush, Clip, and Mid, which denote respectively the lowest black level, the highest white level, and the average gray level of the input sequence. Their values can be computed for each frame, a part of a frame, or for a sequence of frames in a scene. The values of these parameters may either be computed based on the input video stream or they may be part of the input metadata (106). In an embodiment, these parameters are calculated on a per scene basis. As used herein, the terms 'scene' or 'shot' denote a series of sequential-in-capture frames that may share the same overall brightness characteristics. Scene cuts may be determined manually, or they may also be part of the input metadata. For example, an array of Cuts [ ] may define the frame numbers of scene cuts. Alternatively, a parameter in each frame may define whether the frame represents the beginning of a scene cut.

Given these values and the S2Tratio value, in an embodiment, one may compute the following intermediate tone curve adjustment parameters:

$$Slope = \sqrt{\frac{1}{S2Tratio}} * ScreenRatio$$

denotes the mid-tones contrast. It is adjusted according to the S2Tratio value in order to preserve the appearance of contrast.

$$Key = 2 * \frac{Mid - Crush}{Clip - Crush}$$

is an indication of a "dark" or "bright" scene. Low Key (dark) scenes may be mapped slightly brighter and high Key (bright) scenes may be mapped slightly darker in order to preserve dark and bright detail respectively.

Shift=Mid*(1−S2Tratio)*Key*ScreenRatio) denotes an amount by which the image is darkened.

Rolloff is typically a constant (e.g., ⅓) and represents the steepness of the transition between mid-tones and highlights/shadows. A smaller value indicates a sharper transition and will have a visual effect of "soft clipping".

Let Min=max(Crush−Shift, Tmin) and Max=min(Clip−Shift, Tmax), then, in an embodiment, using MATLAB notation, the tone curve parameters of the non-linear mapping of equation (2) may be computed as depicted in Table 2.

TABLE 2

SoR = Slope/Roloff;
x1 = power(Crush, SoR);
x2 = power(Mid, SoR);
x3 = power(Clip, SoR);
y1 = power(Min, 1/Rolloff);
y2 = power(Mid − Shift, 1/Rolloff);
y3 = power(Max, 1/Rolloff);
temp = x3 * y3 * (x1 − x2) + x2 * y2 * (x3 − x1) + x1 * y1 * (x2 − x3);
c1 = (x2 * x3 * (y2 − y3) * y1 − x1 * x3 * (y1 − y3) * y2 + x1 * x2 * (y1 − y2) * y3)/temp;
c2 = (−(x2 * y2 − x3 * y3) * y1 + (x1 * y1 − x3 * y3) * y2 − (x1 * y1 − x2 * y2) * y3)/temp;
c3 = ((x3 − x2) * y1 − (x3 − x1) * y2 + (x2 − x1) * y3)/temp;

Given the $C_1$, $C_2$, and $C_3$ parameter above, in an embodiment, the mapped intensity may be computed as:

$$I_m = \left(\frac{C_1 + C_2 I_o^n}{1 + C_3 I_o^n}\right)^{Rolloff}. \qquad (4)$$

Figure 7:
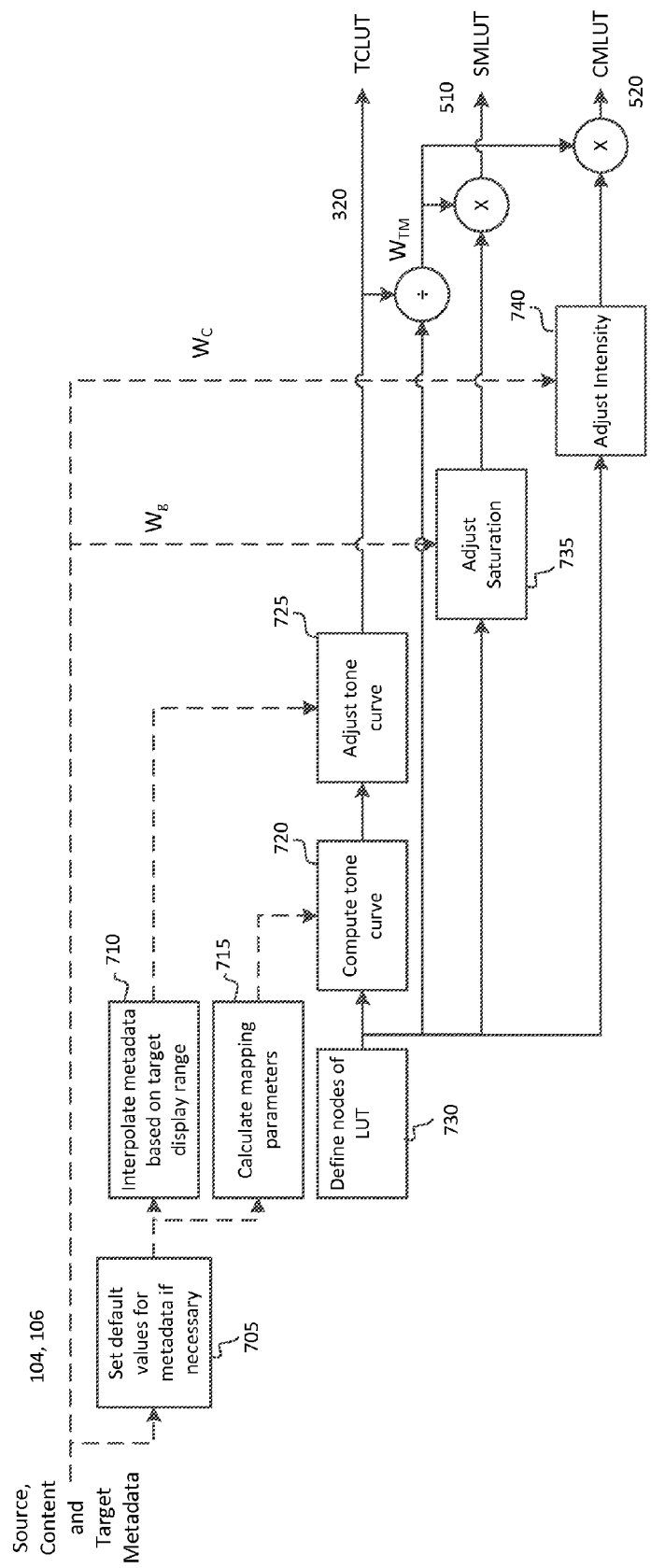
FIG. 7 depicts an example process for computing look-up tables for display management according to an embodiment of the present invention.

In practice, computing the tone-mapped image (322) is typically implemented using a look-up table (e.g., TCLUT, shown in FIG. 7). In some embodiments, the tone-mapping curve may also be further modified by an additional mapping, such as $$I'_m = ((w_s+1)I_m + w_b)^{(\gamma+1)},$$

where the values $w_s$, $w_b$, and $\gamma$ may be signaled by the metadata.

Detail Preservation

Figure 4:
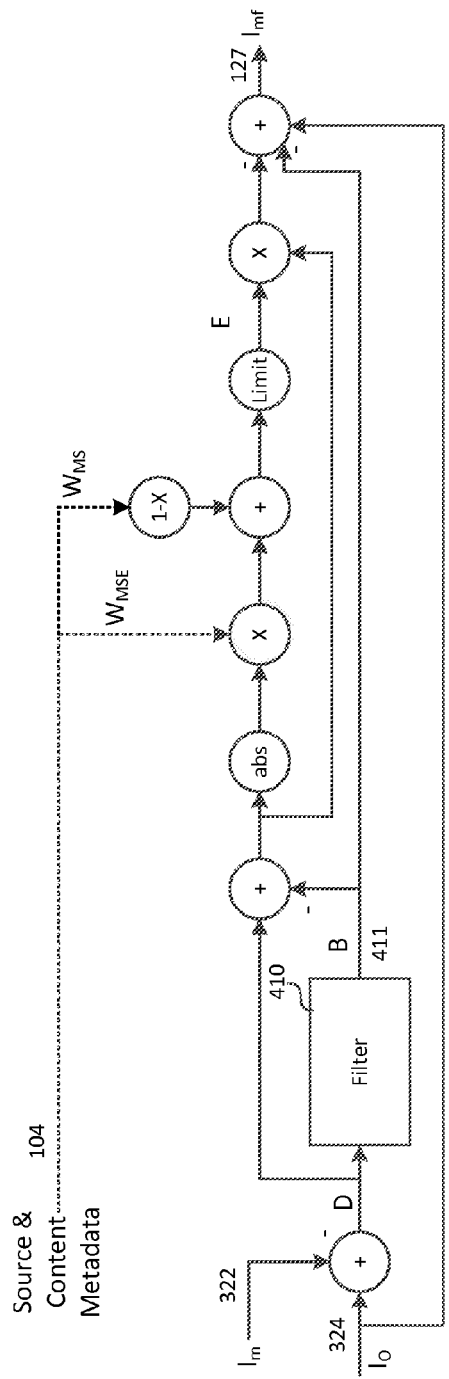
FIG. 4 depicts an example process for detail preservation according to an embodiment of the present invention.

The tone mapping operator of equation (4) is typically referred to as a global tone-mapping operator since the same equation is applied to a whole frame. In an embodiment, global tone-mapping may be followed by a detail preservation operator (125) which improves local contrast. Examples of such a local tone mapping operators are described in the '480 patent and in the '304 Application. FIG. 4 depicts another example of detail preservation according to an embodiment. Given the inputs $I_O$ (324), $I_m$ (322), and source metadata (104), process (125) generates a filtered intensity image $I_{mf}$ (127) according to the following steps.

Let $W_{MSE}$ and $W_{MS}$ denote adjustable weights (e.g., $W_{MS}=1$, $W_{MSE}=4$), which may be extracted from the source metadata. These weights control the amount of detail preservation to be applied. As depicted in FIG. 4, let $$D = I_O - I_m, \quad (5)$$

$$B = F(D, H), \quad (6)$$

where F(D,H) denotes applying to image D a filter with kernel H. In an example embodiment, H comprises a separable 5×11 Gaussian filter with σ=2; however, alternative filters may also be applied. Given B (411), $I_{mf}$ (322), and the input weights, $$E = \max(0, \min(1, |(D-B)| * W_{MSE} + (1-W_{MS}))),$$

$$I_{mf} = I_O - B - E*(D-B). \quad (7)$$

Intensity and Saturation Adjustment

Figure 5:
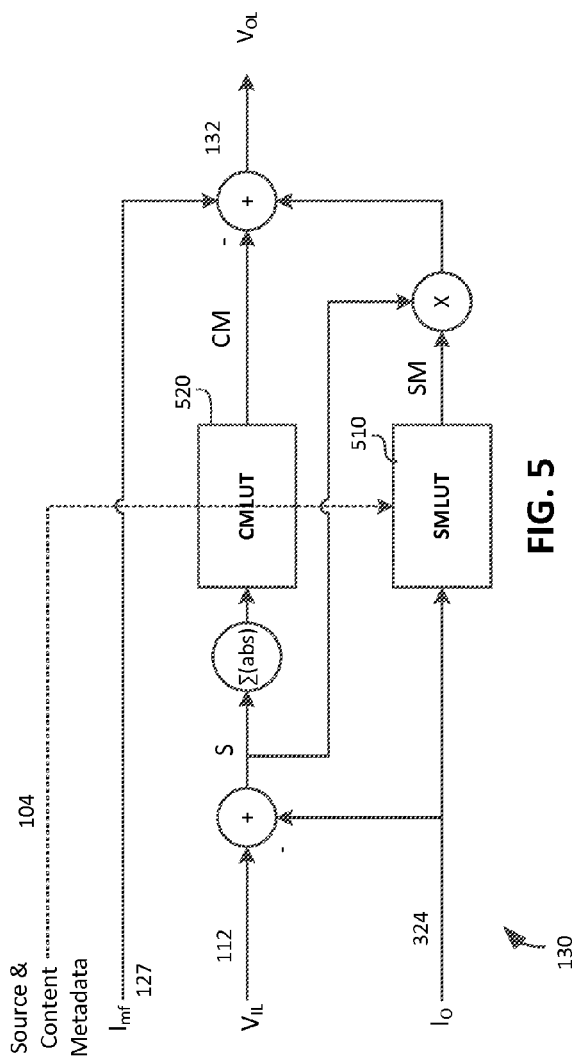
FIG. 5 depicts an example process for color adjustment according to an embodiment of the present invention.

FIG. 5 depicts in more detail an example process for intensity and saturation (color) adjustment (130) according to an embodiment. The goal of this process is to improve overall tonal and chroma quality by:

a) Adjusting the intensity of the tone-mapped output as a function of input saturation b) Adjusting the saturation of the tone-mapped output as a function of input intensity In an embodiment, these operations are performed as follows. Let $V_{IL}$ (112) denote the output of the color transformation stage (110). Let $$S = V_{IL} - I_O,$$

with components $S_i$, i=1,2,3, denote a measure of saturation for the input $V_{IL}$, then $$CM = f_c(\Sigma_i |S_i|),$$

represents an intensity adjustment (e.g., intensity reduction) factor based on a function (e.g., $f_c(\ )$) of the input saturation, and $$SM = f_s(I_o),$$

represents a saturation adjustment factor based on a function (e.g., $f_s(\ )$) of the input intensity. Then, the final adjusted tone-mapped image may be expressed as $$V_{OL} = SM*S + I_{mf} - CM.$$

In an embodiment, the $f_c(\ )$ function has a quadratic input-output characteristic, and the $f_s(\ )$ function is based on the characteristics of the tone-mapping function (e.g., its slope). For example, without limitation, for inputs x and $I_O$, $$f_C(x) = (x*W_c)^2 * W_{TM}, \quad (8)$$

where $W_C$ denotes a chroma weighting factor (e.g., $W_C=0.1$) and $W_{TM}$ denotes another weight dependent on the characteristics of the tone-mapping function. In an embodiment $W_{TM}=1$. In another embodiment $W_{TM}$ may depend on the ratio of $I_m/I_O$ $$\left(e.g., W_{TM} = \max\left(0.5, \min\left(2, \frac{I_m}{I_O}\right)\right)\right).$$

In an embodiment, $$f_s(I_o) = \max\left(0, \min\left(1, 1 - \frac{dI_m}{dI_o}\right)\right) * W_g, \quad (9)$$

where $W_g$ denotes a saturation gain factor (e.g., $W_g=0.25$), and $$\frac{dI_m}{dI_o}$$

denotes the derivative (slope) of the tone-mapping curve (e.g., $I_m = f_T(I_O)$). In some embodiments, weights $W_C$ and $W_g$ may be available as part of the source metadata.

In another embodiment, let values $g_1$, $g_2$, and $g_3$ denote three saturation gain values corresponding to the Crush, Mid, and Clip values, which may also be received using metadata. Then $f_s(\ )$ may represent the input-output relationship of a curve interpolated from the (Crush, $g_1$), (Mid, $g_2$), and (Clip, $g_3$) values (e.g., via a spline or polynomial interpolation, such as the output of the MATLAB interp1 ( ) function). For example, using MATLAB-like notation, the SMLUT (510) look-up table may be generated as:

$$f_S(I) = \max(0.5, \min(2, \text{interp1}([\text{Crush Mid Clip}], [g1\ g2\ g3], I, \text{'spline'}).*W_{TM})); \quad (10)$$

As depicted in FIG. 5, the $f_c(\ )$ and $f_s(\ )$ functions may be implemented using lookup tables CMLUT (520) and SMLUT (510). FIG. 7 provides an example process for creating the tone-mapping (TCLUT) and saturation and intensity adjustment (CMLUT and SMLUT) look-up tables according to an embodiment. As depicted in FIG. 7, after an initialization step (705), in step (710), required metadata values may be interpolated as needed based on the characteristics of the source and target displays. Based on the given parameters, mapping parameters and a tone mapping curve (e.g., $Y = f_T(X)$) are computed, (e.g., based on equation (4)), to generate the tone-mapping look-up table TCLUT. Using saturation and intensity adjustment functions $f_c(\ )$ and $f_s(\ )$, the SMLUT and CMLUT look-up tables may also be computed as described earlier. In an embodiment, for 12-bit input signals, each of the display management look-up tables comprises $2^{12} = 4,096$ entries.

Output Color Conversion

Figure 6:
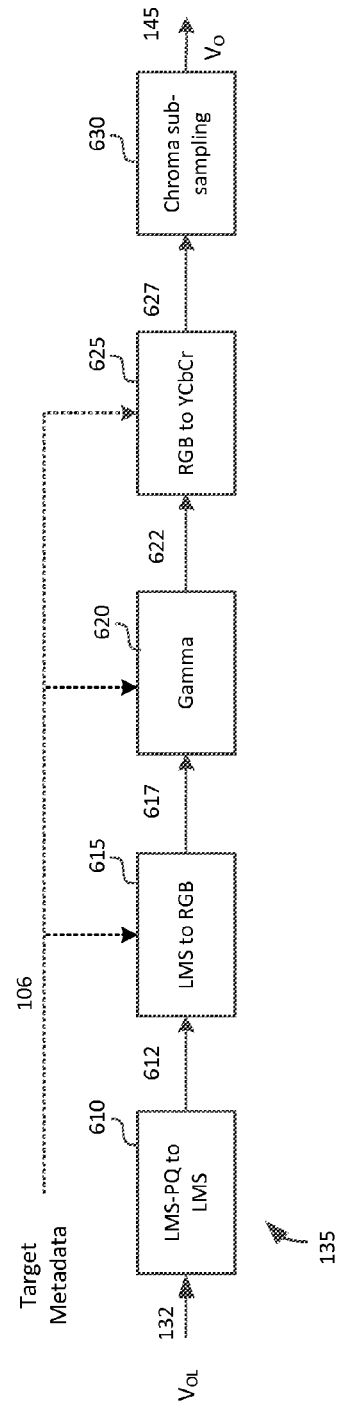
FIG. 6 depicts an example process for output color conversion according to an embodiment of the present invention.

FIG. 6 depicts an example of color conversion process (135) to translate the mapped EDR signal $V_{OL}$ (132) from the perceptually-quantized color space (e.g., LMS-PQ) back to a desired color space (e.g., RGB or YCbCr). This process mirrors the processing steps in the input color converter (110), performed now in reverse order. As depicted in FIG. 6, the color conversion may include the following steps:

a) Step (610): Convert the mapped signal $V_{OL}$ (132) from the LMS-PQ space to the LMS space. This step is computed using the equations of Table 1. In an embodiment, this step may be performed using three 1-D LUTs.

b) Step (615): Convert the LMS signal (612) to an RGB signal (617), typically performed using a 3×3 matrix based on the profile of the target display.

c) Step (620): Apply gamma or PQ encoding to the RGB signal (617) to generate a gamma-corrected or PQ-coded RGB signal (622).

d) Steps (625, 630): If needed, convert the gamma-corrected RGB signal (622) to another color format, such as YCbCr 4:4:4 (627) or YCbCr 4:2:0 (145).

Distributed Display Management

Embodiments described herein may all be implemented in a single target device, such as a set-top-box or a television set, or they may be distributed across multiple devices and sites, such as a content creator and the target device. While the target device has the most information regarding its own processing capabilities and the viewing environment, it may not have all the processing capabilities to perform all steps of the display management pipeline. In general, the complexity of tone mapping and gamut mapping operations is proportional to the difference in display characteristics between the source (or reference) display and the target display. Hence, in some embodiments, the display management operations may be simplified by delivering content intended for a display with capabilities as close as possible to the target display.

Consider the case of delivering EDR content to a family of devices with known display characteristics, but limited power (e.g., tablets or smartphones), then, in an embodiment:
a) Given the master EDR content (at the highest possible dynamic range), the content distribution system creates an intermediate EDR version with a lower dynamic range or color gamut by applying the display management process described herein (e.g., (100) for a typical target display;
b) The metadata is also updated accordingly. For example, the "source display metadata" are updated to reflect the characteristics of the target display and the content metadata are adjusted to reflect the characteristics of the intermediate EDR version;
c) A device accesses the intermediate EDR version and the revised metadata and performs a simplified display management process to make adjustments for its own capabilities and viewing environment.

For example, regarding step c), a simplified display management (DM) process may skip the detail preservation step (125). If the input is already in the appropriate color format (say, LMS-PQ or IPT-PQ), then the color conversion step (110) could also be simplified or eliminated. Similarly, if the target display can operate directly in a perceptually quantized color space (such as LMS-PQ or IPT-PQ), then the output color conversion step (135) may be eliminated as well.

As described earlier, multiple steps of the DM process (or even the whole DM process, if one excludes the detail preservation step (125)) may be mapped into LUTs which may be updated as needed (e.g., when there is a change in the metadata). In an embodiment, a device may have the option to switch among a default LUT-based DM process, which provides the least computation load, the full DM process (e.g., 100), which provides the most accurate DM, or a simplified DM process (e.g., skipping detail preservation (125)). Such switching may be controlled by both the content provider (e.g., using a flag in the metadata on a scene by scene basis), or the target device itself (e.g., based on the computational load, ambient conditions, or user preferences).

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the display management and display of images with enhanced dynamic range, such as those described herein. The computer and/or IC may compute any of a variety of parameters or values that relate to the display management processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to the display management of EDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to the efficient display management of EDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for the display management of images with a processor, the method comprising:
by apparatus comprising one or more data processors configured by software, one or more programmable logic devices, one or more logic circuits or a combination thereof:
accessing an input image (102) in a first color space with a first dynamic range;
applying a color transformation step (110) to the input image to determine a first output image (112) in a perceptually-quantized (PQ) color space, wherein the color transformation from the first color space to the PQ color space is based at least in part in applying a non-linear perceptual quantizer function to a function of the input image;

generating an intensity component (324) of the first output image (112);

in response to characteristics of a target display, applying a non-linear tone-mapping function (320) to the intensity (IO) component of the first output image (112) to determine a tone-mapped intensity image (322) for the target display;

applying a detail preservation function (125) to generate a filtered tone-mapped intensity image (127) in response to the intensity component (324) of the first output image and the tone-mapped intensity image (322);

generating an intensity adjustment factor (CM) in response to a saturation metric (S) of the first output image;

generating a saturation adjustment factor (SM) in response to a function of the intensity component of the first output image (324); and generating a second output image (132) in response to the intensity adjustment factor (CM), the saturation adjustment factor (SM), and the filtered tone-mapped intensity image, wherein the second output image has a different dynamic range than the input image.

2. The method of claim 1, wherein applying the color transformation step (110) further comprises:

converting (215) the input image to the RGB color space to generate an RGB image (217);

removing any non-linear encoding (220) from the RGB image (217) to generate a linear RGB image (222);

converting the linear RGB image (222) into an LMS color image (227); and applying the non-linear perceptual quantizer (PQ) function to the LMS color image to generate the first output image (112).

3. The method of claim 1, wherein the non-linear tone-mapping function (320) is expressed as a parameterized sigmoidal tone curve function, wherein parameters of the function are determined based on characteristics of a source display and a target display.

4. The method of claim 3 wherein the characteristics of the source display comprise a minimum brightness value and a maximum brightness value for the source display.

5. The method of claim 3, wherein the characteristics of the target display comprise a minimum brightness value and a maximum brightness value for the target display.

6. The method of claim 3, wherein the characteristics of the source display are accessed through received source display metadata (104).

7. The method of claim 3, wherein the sigmoidal tone function is expressed as $$I_m = \left(\frac{C_1 + C_2 I_o^n}{1 + C_3 I_o^n}\right)^{Rolloff}$$

wherein $C_1$, $C_2$, $C_3$, and Rolloff are constants defining the parameters of the tone-mapping function, and for an input $I_o$, $I_m$ is a corresponding output value.

8. The method of claim 7, wherein the $C_1$, $C_2$, and $C_3$ constants are determined at least in part based on one or more gray-value characteristics of the input image (102).

9. The method of claim 8, wherein the gray-value characteristics of the input image (102) are accessed through content metadata (106) and comprise a minimum luminance value (Crush), a maximum luminance value (Clip), and an average mid-tone luminance value (Mid).

10. The method of claim 8 wherein the $C_1$, $C_2$, and $C_3$ constants are determined at least in part based on one or more intermediate tone curve adjustment parameters.

11. The method of claim 1, wherein applying the detail preservation function further comprises computing:

$$D = I_o - I_m,$$

$$B = F(D, H),$$

$$I_{mf} = I_O - B - f_E(D, B),$$

where $F(D, H)$ denotes applying to image D a filter with kernel H, $I_o$ denotes intensity pixel values of the first output image (112), $I_m$ denotes the tone-mapped intensity image, $I_{mf}$ denotes the filtered tone-mapped intensity image, and $f_E(D, B)$ is a function of the D and B values.

12. The method of claim 11, wherein, given $$E = \max(0, \min(1, abs(D-B) * W_{MSE} + (1 - W_{MS}))),$$

$$f_E(D, B) = E * (D - B),$$

where $W_{MSE}$ and $W_{MS}$ are weighting factors.

13. The method of claim 11 wherein the kernel H comprises a 5×11 Gaussian filter with standard deviation equal to 2.

14. The method of claim 11 wherein the kernel H comprises a low-pass filter.

15. The method of claim 1, wherein generating the intensity component for a pixel of the first output image, wherein the pixel comprises two or more color components, comprises:

computing a first weighted average of the two or more color components of the pixel;

computing the maximum of the two or more color components of the pixel; and computing a second weighted average of the maximum and the first weighted average.

16. The method of claim 1, wherein generating the second output image (132) comprises computing:

$$S = V_{IL} - I_O,$$

$$V_{OL} = SM * S + I_{mf} - CM,$$

where, $V_{IL}$ denotes the first output image, $I_O$ denotes the intensity component of the first output image, $V_{OL}$ denotes the second output image, CM denotes the intensity adjustment factor, SM denotes the saturation adjustment factor, and $I_{mf}$ denotes the filtered tone-mapped intensity image.

17. The method of claim 15, wherein $$CM = f_c(S),$$

wherein $f_c(\ )$ denotes a function of saturation with a quadratic input-output characteristic.

18. The method of claim 17, wherein for an input S $$f_c(S) = ((\Sigma_i (abs(Si)) * W_c)^2) * W_{TM},$$

wherein $W_C$ and $W_{TM}$ denote weighting factors and $S_i$ denotes a color component of the S value.

19. The method of claim 16, wherein for an intensity input $I_O$ $$SM = f_s(I_O) = \left(1 - \frac{dI_m}{dI_O}\right) * W_g,$$

where $W_g$ denotes a saturation gain factor and $$\frac{dI_m}{dI_O}$$

denotes the slope or the tone-mapping curve $I_m = f_T(I_O)$.

20. The method of claim 18, wherein $W_{TM}$ comprises a function of the tone-mapped intensity image and the intensity component of the first output image.

21. A method for the display management of images with a processor, the method comprising:
by apparatus comprising one or more data processors configured by software, one or more programmable logic devices, one or more logic circuits or a combination thereof:
accessing an input image (102) in a first color space with a first dynamic range;
applying a color transformation step (110) to the input image to determine an intermediate image (112) in a perceptually-quantized (PQ) color space, wherein the color transformation from the first color space to the PQ color space is based at least in part in applying a non-linear perceptual quantizer function to a function of the input image;
generating an intensity component (324) of the intermediate image (112);
in response to characteristics of a first target display and source metadata, applying a non-linear tone-mapping function (320) to the intensity ($I_O$) component of the intermediate image (112) to determine a tone-mapped intensity image (322) for the first target display;
generating an intensity adjustment factor (CM) in response to a saturation metric (S) of the first output image;
generating a saturation adjustment factor (SM) in response to a function of the intensity component of the first output image (324); and
generating an output image (132) in response to the intensity adjustment factor (CM), the saturation adjustment factor (SM), and the tone-mapped intensity image, wherein the output image has a different dynamic range than the input image.

22. The method of claim 21, further comprising
updating the source metadata with characteristics of the first target display and the output image to generate second source metadata; and
transmitting the second source metadata and the output image to a receiving device.

23. The method of claim 22, further comprising:
in the receiving device:
receiving the second source metadata and the output image;
accessing characteristics of a second target display; and
in response to the characteristics of the second target display, the output image, and the second source metadata determining a second output image for the second target display.

24. An apparatus comprising a processor and configured to perform the method recited in claim 21.

25. A non-transitory computer-readable storage medium having stored thereon computer-executable instruction for executing a method with one or more processors in accordance with the method of claim 21.

* * * * *